(12) United States Patent
Hallenstål et al.

(10) Patent No.: US 8,285,983 B2
(45) Date of Patent: Oct. 9, 2012

(54) METHOD AND APPARATUSES FOR ESTABLISHING A SECURE CHANNEL BETWEEN A USER TERMINAL AND A SIP SERVER

(75) Inventors: Magnus Hallenstål, Täby (SE); Torbjörn Cagenius, Sollentuna (SE); Andreas Fasbender, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 753 days.

(21) Appl. No.: 12/301,196

(22) PCT Filed: May 15, 2006

(86) PCT No.: PCT/EP2006/062314
§ 371 (c)(1),
(2), (4) Date: Jun. 16, 2009

(87) PCT Pub. No.: WO2007/131548
PCT Pub. Date: Nov. 22, 2007

(65) Prior Publication Data
US 2009/0282236 A1    Nov. 12, 2009

(51) Int. Cl.
*H04L 29/06* (2006.01)
(52) U.S. Cl. .......................... 713/151; 709/230; 713/155
(58) Field of Classification Search .................. 713/151, 713/155; 709/230
See application file for complete search history.

(56) References Cited

U.S. PATENT DOCUMENTS

| 7,206,582 | B2 * | 4/2007 | Tom et al. ...................... 455/445 |
| 7,694,015 | B2 * | 4/2010 | Yoshiuchi et al. ............ 709/244 |
| 2003/0005280 | A1 * | 1/2003 | Bobde et al. .................. 713/150 |
| 2006/0077959 | A1 * | 4/2006 | Beckemeyer ................. 370/352 |

FOREIGN PATENT DOCUMENTS
WO    WO 2005/039141 A    4/2005

OTHER PUBLICATIONS

Hesselman et al., Delivering live multimedia streams to mobile hosts in a wireless internet with multiple content aggregators. Mobile Networks and Applications—Special issue: Wireless mobile wireless applications and services on WLAN hotspots. vol. 10 Issue 3, Jun. 2005. Kluwer Academic Publishers Hingham, MA, USA. pp. 1-13.*
Rosenberg et al., SIP: Session Initiation Protocol. RFC SIP: Session Initiation Protocol. 2002 RFC Editor, United States. pp. 1-343.*

* cited by examiner

*Primary Examiner* — Kambiz Zand
*Assistant Examiner* — Aubrey Wyszynski

(57) ABSTRACT

A method of establishing a secure communication channel between a user terminal (2) and a SIP server (14) for the purpose of controlling a service such as an IPTV service. The method comprises sending from the user terminal (2) to the SIP server (14) a session initiation request, via an IP Multimedia Subsystem network, where the IP Multimedia Subsystem network incorporates into the request a P-Asserted-Identity. At the SIP server (14), access to the service is authorized on the basis of said P-Asserted-Identity and, upon successful authorization, a security token is sent to the user terminal (2), via the IP Multimedia Subsystem network. The SIP server (14) and the user terminal (2) use said security token to establish a secure communication channel between each other.

13 Claims, 4 Drawing Sheets

METHOD AND APPARATUSES FOR ESTABLISHING A SECURE CHANNEL BETWEEN A USER TERMINAL AND A SIP SERVER

TECHNICAL FIELD

The present invention relates to control of an IP service and in particular, though not necessarily, to the control of an IP television service.

BACKGROUND

IP television or IPTV is the name given to a range of services which allow television to be delivered over an IP network. IPTV is a service which will likely be facilitated by the so-called IP Multimedia Subsystem (IMS). IMS is the technology defined by the Third Generation Partnership Project (3GPP) to provide IP Multimedia services over mobile communication networks (3GPP TS 22.228, TS 23.218, TS 23.228, TS 24.228, TS 24.229, TS 29.228, TS 29.229, TS 29.328 and TS 29.329 Releases 5 to 7), although the IMS architecture is such that its services can be accessed and controlled via other interfaces, for example the Internet. IMS makes use of the Session Initiation Protocol (SIP) to set up and control calls or sessions between user terminals, or user terminals and application servers. The Session Description Protocol (SDP), carried by SIP signalling, is used to describe and negotiate the media components of the session. Whilst SIP was created as a user-to-user protocol, IMS allows operators and service providers to control user access to services and to charge users accordingly.

Due to the flexible nature of an IP network, IPTV will allow for a much more personalised service to users, e.g. video-on-demand, with information delivered to users over unicast IP streams. However, to order and control these user specific services, the user would normally be expected to use his or her remote control whilst sitting in front of a Set-Top-Box/TV. Such an approach would not allow users to take advantage of the mobility which should be facilitated by the IMS.

Solutions which allow a user to remotely access television services delivered to a specific location, via an IP connection to that location, are available. These typically require a home gateway which distributes television service from, for example, a cable modem, to user terminals over the Internet. Examples include LocationFree™ TV from Sony Corporation or the Slingbox™ from Sling Media.

SUMMARY

It is desirable to provide a means whereby users can use devices other than set top boxes to access and control an IPTV service. Such devices include, for example, mobile telephones. However, whilst the IP Multimedia Subsystem core provides a secure network across which IPTV control data can be transported between a mobile terminal and an IPTV application server, the use of the IMS to transport large volumes of control data would be expensive in terms of network costs, whilst adding a delay to the signalling transit times. It is preferable to establish a direct, but still secure signalling channel between the user terminal and the application server, for example using SSL/TLS over TCP.

According to a first aspect of the present invention there is provided a method of establishing a secure communication channel between a user terminal and a SIP server for the purpose of controlling a service or services, the method comprising:

sending from the user terminal to the SIP server a session initiation request, via an IP Multimedia Subsystem network, the IP Multimedia Subsystem network incorporating into the request a P-Asserted-Identity;

at the SIP server, authorising access to the service on the basis of said P-Asserted-Identity; and upon successful authorisation, sending to the user terminal a security token, via the IP Multimedia Subsystem network, wherein the SIP server and the user terminal use said security token to establish a secure communication channel between each other.

The term "SIP server" is used here to denote any means for provisioning a service using a SIP interface. The term covers, for example, a SIP application server resident within an IMS network, or a home IMS gateway attached to a home (i.e. domestic) network.

Embodiments of the invention provide an efficient mechanism for establishing a secure signalling channel outside of the IMS, but piggybacking on the inherent security and trust of the IMS to establish an initial shared secret.

Said secure communication channel need not be routed through the IP Multimedia Subsystem.

A particular application of the invention is the control of an IP television (or IPTV) service. Once the secure communication channel has been established between the user terminal and an IPTV application server, it can be used to request delivery of an IPTV stream, either to the user terminal to which the secure channel is established or to another user terminal. The invention is applicable however to the control of other services.

The user terminal may be any suitable apparatus. For example it may be a mobile device such as a mobile (cellular) telephone or a set top box (STB).

In an embodiment of the invention, the security token is provided to the user terminal by the SIP server. The token may be generated by the SIP server or obtained by the SIP server from some other network node. Alternatively, the token may be delivered to the user terminal, and to the SIP server, from some other node, for example a Call/Session Control Function of the IP Multimedia Subsystem network.

In an embodiment, said session initiation request is conveyed as a SIP INVITE message, and said security token is conveyed within the SIP 200 OK response.

According to a second aspect of the present invention there is provided apparatus for establishing a secure communication channel between a user terminal and a SIP server for the purpose of controlling a service or services, the apparatus comprising:

a user terminal comprising means for sending to the SIP server a session initiation request, via an IP Multimedia Subsystem network, the IP Multimedia Subsystem network incorporating into the request a P-Asserted-Identity; and a SIP server comprising means for authorising access to the service on the basis of said P-Asserted-Identity, and, upon successful authorisation, for sending to the user terminal a security token, via the IP Multimedia Subsystem network, the SIP server and the user terminal comprising means for using said security token to establish a secure communication channel between each other.

According to a third aspect of the present invention there is provided a user terminal for use in controlling a service facilitated by a SIP server of an IP Multimedia Subsystem, the user terminal comprising:

means for sending to the SIP server a session initiation request, via an IP Multimedia Subsystem network; and means for receiving a security token from the IP Multimedia Subsystem and for using said security token to establish a secure communication channel with said SIP server.

According to a fourth aspect of the present invention there is provided a SIP server comprising:

means for receiving from a user terminal, via an IP Multimedia Subsystem network, a session initiation request, the IP Multimedia Subsystem network incorporating into the request a P-Asserted-Identity;

means for authorising access to the service on the basis of said P-Asserted-Identity;

means for causing a security token to be sent to the user terminal, via the IP Multimedia Subsystem network, upon successful authorisation; and means for using said security token to establish a secure communication channel with the user terminal.

DETAILED DESCRIPTION

Figure 1:
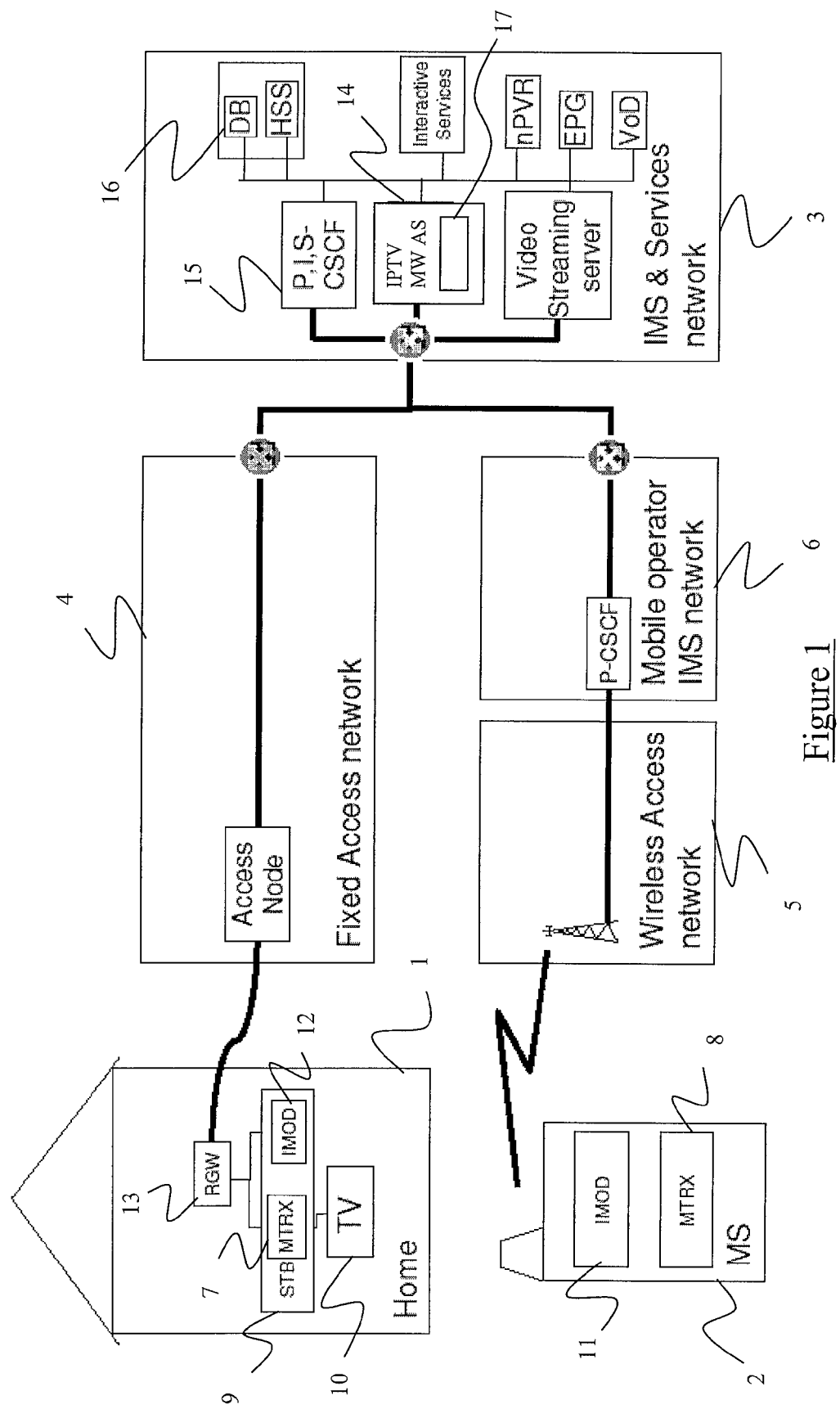
FIG. 1 illustrates schematically an IP television topology employing an IP Multimedia Subsystem.

By way of background to a discussion of an embodiment of the invention, the following is a brief description of the architecture and operation of the IP Multimedia Subsystem (IMS). Call/Session Control Functions (CSCFs) operate as SIP proxies within the IMS. The 3GPP architecture defines three types of CSCFs: the Proxy CSCF (P-CSCF) which is the first point of contact within the IMS for a SIP client (typically residing in a user terminal); the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the (IP) address at which a SIP user identity can be reached. The user receives a unique Uniform Resource Identifier (URI) from the S-CSCF to be used when it initiates a dialog. In 3GPP, when a SIP client performs a registration, the IMS authenticates the user (using the AKA procedure), and allocates a S-CSCF to that user from the set of available S-CSCFs. Whilst the criteria for allocating a S-CSCF is not specified by 3GPP, these may include load sharing and service requirements. It is noted that the allocation of an S-CSCF is key to controlling (and charging for) user access to IMS-based services.

During the registration process, it is the responsibility of the I-CSCF to select an S-CSCF if one is not already selected. The I-CSCF receives the required S-CSCF capabilities from the home network's Home Subscriber Server (HSS), and selects an appropriate S-CSCF based on the received capabilities. (It is noted that S-CSCF allocation is also carried out for a user by the I-CSCF in the case where the user is called by another party, and the user is not currently allocated an S-CSCF.) When a registered user subsequently sends a session request (e.g. SIP INVITE) to the IMS, the request will include the P-CSCF and S-CSCF URIs so that the P-CSCF is able to forward the request to the selected S-CSCF. This applies both on the originating and terminating sides (of the IMS). (For the terminating call the request will include the P-CSCF address and the User Equipment (UE) address.)

Within the IMS service network, Application Servers (ASs) are provided for implementing IMS service functionality. ASs provide services to end-users in an IMS system, and may be connected either as end-points over the 3GPP defined Mr interface, or "linked in" by an S-CSCF over the 3GPP defined ISC interface. In the latter case, Initial Filter Criteria (IFCs) are used by a S-CSCF to determine which ASs should be "linked in" during a SIP Session establishment. Different IFCs may be applied to different call cases. The IFCs are received by the S-CSCF from an HSS during the IMS registration procedure as part of a user's User Profile (UP). Certain ASs will perform actions dependent upon subscriber identities (either the called or calling subscriber, whichever is "owned" by the network controlling the AS). For example, in the case of call forwarding, the appropriate (terminating) application server will determine the new terminating party to which a call to a given subscriber will be forwarded.

There is described here a solution for remotely accessing an IPTV subscription and a personal IPTV service portal, from a device other than the main device associated with the subscription (normally the set top box (STB) at home) in a secure manner.

FIG. 1 presents an overview of the IPTV/IMS architecture illustrating the apparatus/functionality provisioned within the home 1 and the MS 2, which are attached respectively to the IMS 3 via a fixed access network 4 and a wireless access network 5/Mobile operator IMS network 6. Network elements of interest here are:

MTRX—Media Transmission/Reception Part 7, 8; The "traditional" Set Top Box functionalities in an IMS enabled Set Top Box 9, for example reception of MPEG2 and/or MPEG4 streams and conversion of such streams for delivery to a TV 10.

IMOD—Identity and IMS Module 11, 12; The part of an IMS enabled Set Top Box that contains the basic IMS service logic and the ISIM. The IMOD could also be implemented in other devices in the home, e.g. the Residential Gateway (RGW) 13. The IMOD could also be implemented in a mobile phone, enabling remote access to TV services.

IPTV MW AS—IPTV Middleware SIP Application Server 14; The function that interacts between the IMS enabled STB and other IMS user devices and the IPTV video servers.

MTRX and the IMOD entities will be present within STBs that are used to access the IPTV service via the IMS. In addition, and as illustrated in the FIG. 1, these entities are present within a Mobile Station (MS) or user terminal, which could for example be a cellular telephone. It will be appreciated that the MS may be present within an IMS network of an operator that is not the operator of the IPTV provider. In this case, a mechanism is required to securely allow a "roaming" user to remotely access (i.e. log-in to) the IPTV service.

Assuming that a user is registered with an IMS network, the public user identity (IMPU) used by the MS will be the P-Asserted identity for the MS. Any SIP message sent from the MS to the IMS will include the public user identity as the P-Preferred identity within the message. The P-CSCF 15 within the IMS will replace the P-Preferred identity with the P-Asserted identity. Any node subsequently receiving the message will know that P-Asserted identity correctly identifies the sender, assuming that the receiving node trusts the P-CSCF. [A sending node will only include the P-Asserted identity in a message if the receiving node is trusted by it. Otherwise, the sending node will omit the P-Asserted Identity.]

Figure 2:
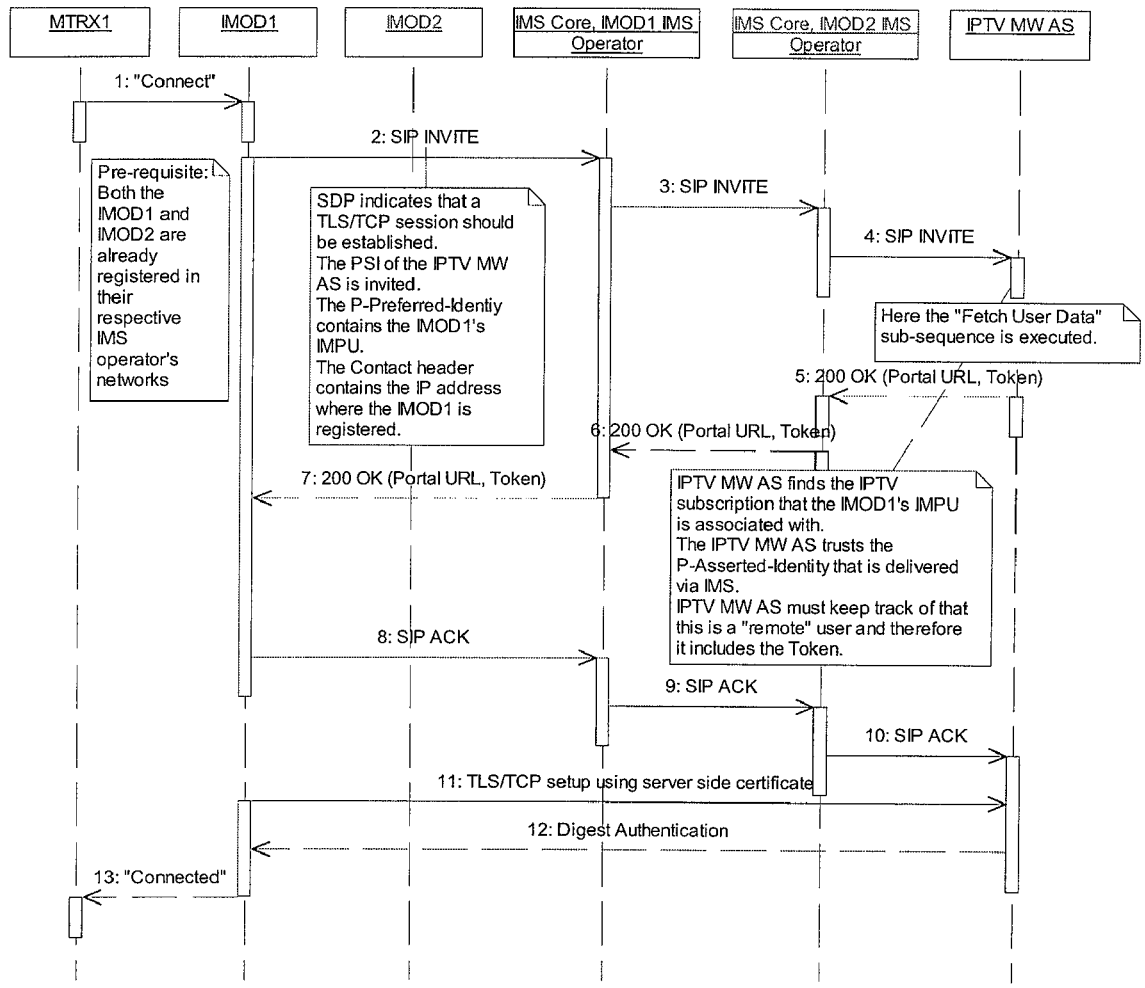
FIG. 2 shows signalling associated with establishing a secure TLS over TCP control channel between a user terminal and an IP television application server.

A session between the MS and the IPTV MW AS is initiated by the MTRX1 of the MS sending a connect request to the IMOD1. This (step 1) and the subsequent signalling steps are illustrated in FIG. 2. More particularly, these subsequent steps are as follows:

Step 2: The IMOD1 sends an invite to the Public Service Identity (PSI) of the IPTV MW AS (this PSI identifying the IPTV service for the STB, i.e. IMOD2). The P-Preferred-Identity of the invite message is set to the IMPU of the IMOD1.

Step 3: The P-CSCF will authenticate the MS using appropriate processor and software structures 17 (using the user profile downloaded from the HSS at registration) and, assuming that authentication is successful, will replace the P-Preferred-Id with the P-Asserted-Id upon successful authentication.

Step 4: The IPTV MW AS will trust the P-Asserted Identity, and will authorize the remote user to access the specific ITPV subscription using a database 16 containing pre-approved IMPUs (P-Asserted-Ids).

Steps 5 to 7: Assuming that the remote user is authorized, the MW AS sends to the MS a 200 OK including an attached SDP with the URL of the user's portal and a pseudo-random number (token) used to later authenticate the IMOD1 when it sets up a direct connection to the IPTV MW AS.

Steps 8 to 10: The MS returns a SIP ACK to the IPTV MW AS.

Steps 11 and 12: A secure Transport Layer Security (TLS)/Secure Socket Layer (SSL) over Transmission Control Protocol (TCP) session is set up using the server side certificate. To authenticate the client, the server will request a username and password, e.g. through HTTP digest, SSH, or something similar. The password is equal to the token sent in step 5 to 7.

Step 13: The IMOD1 notifies the MTRX1 that a connection to the IPTV service has been established.

Steps 11 and 13 do not involve signalling over the IMS network, and result in the establishment of a secure TCP communication channel between the MS and the IPTV MW AS. Signalling sent over this secure channel does not travel via the IMS, and therefore does not add to the levels of traffic on the IMS. It can also be expected that signalling sent via the secure channel will arrive at its destination quicker than it would if sent over the IMS as the "direct" signalling route is more likely to be optimal.

Figure 3:
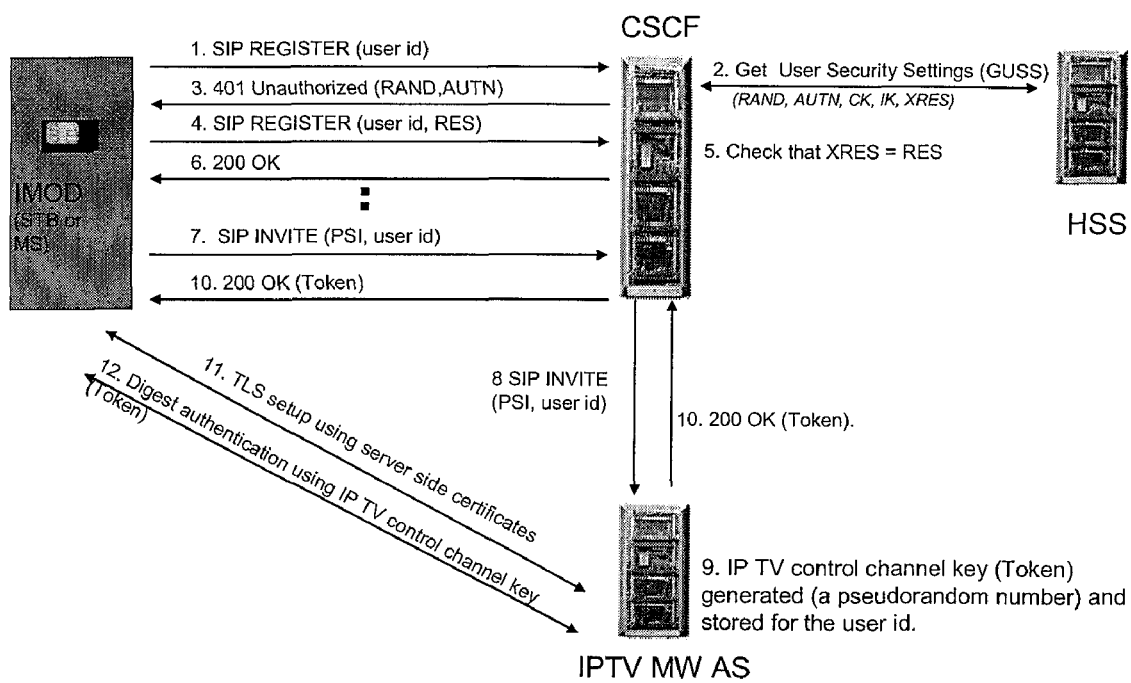
FIG. 3 shows an overview of signalling associated with registering a subscriber to an IP Multimedia Subsystem and establishing a secure TLS over TCP control channel between a user terminal of the subscriber and an IP television application server.

FIG. 3 presents an overview of the secure channel establishment process, which follows an initial registration of the MS with the IMS.

It is noted that the procedure for establishing the secure communication channel relies upon the inherent security of IMS, and is not based on the authentication vector established during the AKA process. The IPTV provider trusts the "P-Asserted-Id" inserted by the remote IMS operator and the encryption of messaging between the MS and the P-CSCF. The IPTV MW AS generates the token and sends this to the IMOD1 over the (secure) IMS channel to be used by the MTRX when accessing the IPTV MW AS. This is especially useful when the remote user is logging in via an IMS operator other than the IPTV operator, since the IMS authentication vectors might not be available to the IPTV operator.

The solution presented here has no impact on the IMS core (or IMS standards) since it only affects the IPTV MW AS and the terminal (IMOD). The solution may be implemented relatively quickly and at relatively low cost. In particular, the solution is in many ways preferable to an alternative solution known as the Generic Bootstrapping Architecture (GBA), as GBA requires significant changes to the IMS architecture.

It will be appreciated by the persons skilled in the art that various modifications may be made to the embodiments described above without departing from the scope of the present invention. For example, whilst the above discussion is concerned with IPTV, the secure log-in procedure described may be used to log-in to other IP-based services.

Figure 4:
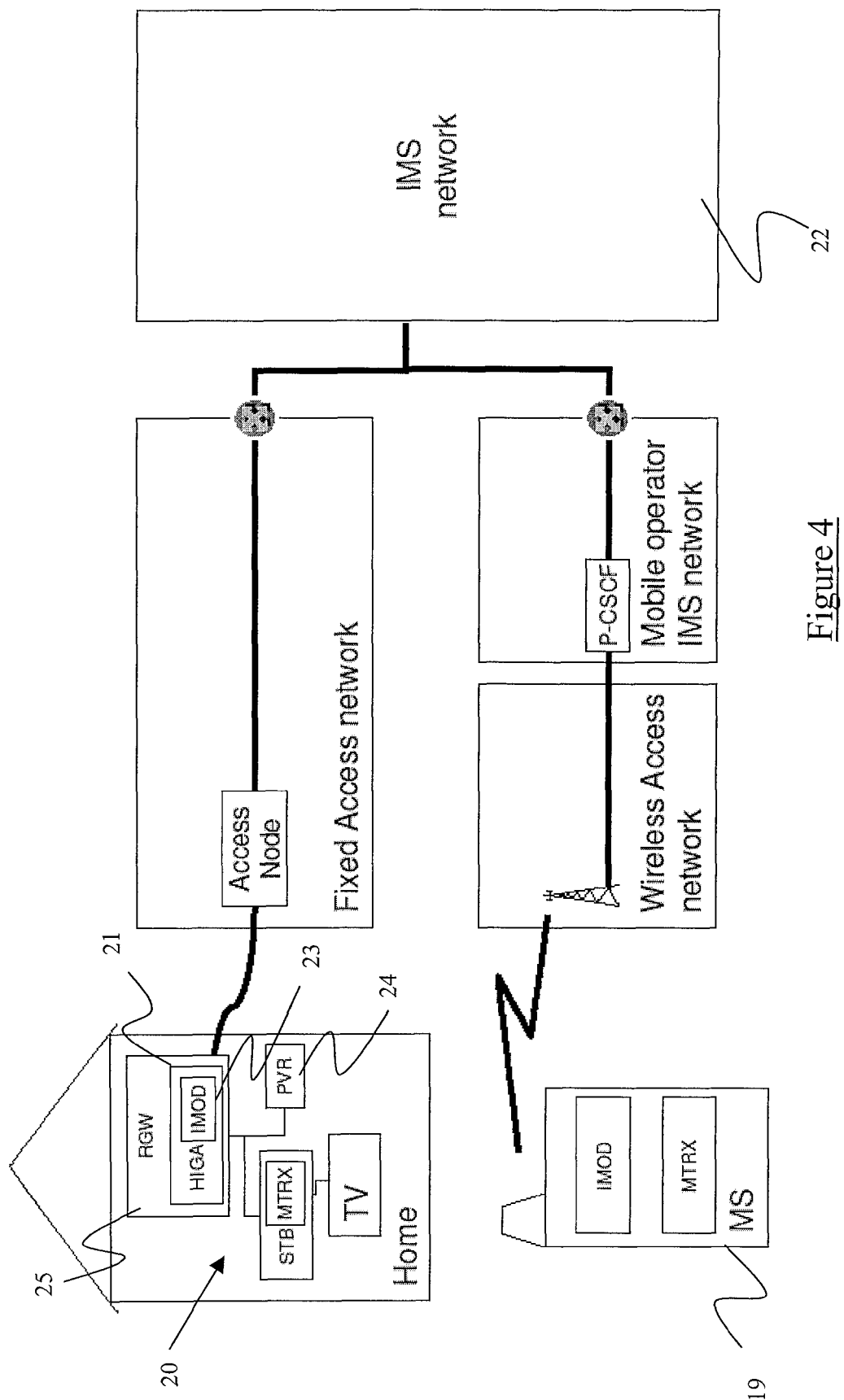
FIG. 4 illustrates schematically a network architecture allowing a remote terminal to securely log-in to a home network via a home IMS gateway.

The invention may also be applied to allow a remote terminal 19 to log-in securely to a service provisioned by a user's home network 20, as illustrated in FIG. 4. Consider for example the Home IMS Gateway (HIGA) 21 [see ETSI TS 187 003 v1.1.1] which, as the name suggests, provides a gateway between a domestic or home network 20 and the IMS 22, where the HIGA and residential gateway (RGW) 25 are integrated together (although this need not be the case). A core function of the HIGA 21 is the IMOD 23. The HIGA allows both SIP and non-SIP clients within the home network to establish, terminate, and control IMS sessions. For SIP clients, the HIGA can act as a back-to-back user agent (B2BUA). For non-SIP clients, the HIGA communicates with these clients using, for example, the generic UPnP protocol, and communicates with the IMS on behalf of the non-SIP clients. In the case of IPTV, television data may be stored on a home PC or personal video recorder (PVR) 24 attached to the home network. In this scenario, a security token is sent from the HIGA 21 to the remote terminal 19, following authorisation of the remote terminal by the HIGA, based upon the P-asserted identity of the remote terminal (or user).

The invention claimed is:

1. A method of establishing a secure communication channel between a user terminal and a SIP server for the purpose of controlling a service or services provisioned by the SIP server, the method comprising:
    sending from the user terminal to the SIP server a session initiation request, via an IP Multimedia Subsystem network, wherein the IP Multimedia Subsystem network authenticates the user terminal and incorporates a P-Asserted-Identity into the request as a result of the authentication;
    at the SIP server, authorising access to the service on the basis of said P-Asserted-Identity; and,
    upon successful authorisation, sending to the user terminal a security token, via the IP Multimedia Subsystem network, wherein the SIP server and the user terminal use said security token to establish a secure communication channel between each other.

2. The method according to claim 1, wherein said security token is provided to the user terminal by the SIP server.

3. The method according to claim 2, wherein said security token is generated by the SIP server or obtained by the SIP server from some other network node.

4. The method according to claim 1, wherein said session initiation request is conveyed as a SIP INVITE message, and said security token is conveyed within the SIP 200 OK response.

5. The method according to claim 1, further comprising establishing a TLS/SSL over TCP secure communication channel between the user terminal and the SIP server.

6. The method according to claim 1, wherein said SIP server is an IP television application server.

7. The method according to claim 1, wherein said user terminal is a mobile telephone.

8. The method according to claim 1, wherein said SIP server is a SIP application server.

9. The method according to claim 1, wherein said SIP server is a home IP Multimedia Subsystem gateway.

10. A system for establishing a secure communication channel between a user terminal and a SIP server for the purpose of controlling a service or services, the system comprising:
- a user terminal configured to send, to the SIP server a session initiation request, via an IP Multimedia Subsystem network, wherein the IP Multimedia Subsystem network authenticates the user terminal and incorporates a P-Asserted-Identity into the request as a result of the authentication;
- a SIP server configured to authorize access to the service on the basis of said P-Asserted-Identity, and, upon successful authorisation, for sending to the user terminal a security token, via the IP Multimedia Subsystem network;
- wherein the SIP server and the user terminal are configured to use said security token to establish a secure communication channel.

11. A SIP server comprising:
- a processor configured to receive, from a user terminal, via an IP Multimedia Subsystem network, a session initiation request, wherein the IP Multimedia Subsystem network authenticates the user terminal and incorporates a P-asserted-Identity into the request as a result of the authentication;
- the processor further configured to authorize access to the service on the basis of said P-Asserted-Identity;
- the processor further configured to cause a security token to be sent to the user terminal, via the IP Multimedia Subsystem network, upon successful authorisation; and,
- the processor further configured to use said security token to establish a secure communication channel with the user terminal.

12. The SIP server according to claim 11, wherein the SIP server is a SIP application server.

13. The SIP server according to claim 11, wherein the SIP server is a home IP Multimedia Subsystem gateway.

* * * * *

UNITED STATES PATENT AND TRADEMARK OFFICE
CERTIFICATE OF CORRECTION

| | | |
|---|---|---|
| PATENT NO. | : 8,285,983 B2 | Page 1 of 1 |
| APPLICATION NO. | : 12/301196 | |
| DATED | : October 9, 2012 | |
| INVENTOR(S) | : Hallenstal et al. | |

It is certified that error appears in the above-identified patent and that said Letters Patent is hereby corrected as shown below:

In Fig. 2, Drawing Sheet 2 of 4, under "2: SIP INVITE", Line 6, delete "P-Preferred-Identiy" and insert -- P-Preferred-Identity --, therefor.

Signed and Sealed this
Twenty-ninth Day of January, 2013

David J. Kappos
*Director of the United States Patent and Trademark Office*